United States Patent [19]

Snyder

[11] Patent Number: 5,205,864
[45] Date of Patent: Apr. 27, 1993

[54] INORGANIC BASED STRIPPABLE COATINGS FOR ISOLATING HAZARDOUS MATERIALS AND METHOD FOR MAKING AND USING THE SAME

[75] Inventor: Thomas S. Snyder, Oakmont, Pa.

[73] Assignee: Westinghouse Electric Corp., Pittsburgh, Pa.

[21] Appl. No.: 811,362

[22] Filed: Dec. 20, 1991

[51] Int. Cl.$^5$ ............................................. C09K 3/00
[52] U.S. Cl. .......................... 106/287.26; 106/287.16; 501/12; 501/155; 134/1; 134/4
[58] Field of Search ...................... 106/287.16, 287.26; 501/12, 155; 134/1, 4; 427/397.7

[56] References Cited

U.S. PATENT DOCUMENTS

| | | | |
|---|---|---|---|
| 2,577,514 | 12/1951 | De Meat | 134/4 |
| 3,037,886 | 6/1962 | Ryznar | 134/4 |
| 4,632,847 | 12/1986 | Lomasney et al. | 427/154 |
| 4,795,879 | 7/1988 | Cadott et al. | 501/155 |
| 4,797,232 | 1/1989 | Aubert | 501/155 |

FOREIGN PATENT DOCUMENTS

| | | | |
|---|---|---|---|
| 3103353 | 8/1982 | Fed. Rep. of Germany. | |
| 60-202400 | 10/1985 | Japan. | |
| 61-264296 | 11/1986 | Japan. | |
| 62-063689 | 3/1987 | Japan | 134/4 |
| 63-186194 | 8/1988 | Japan. | |
| 85005294 | 12/1985 | PCT Int'l Appl. | 134/4 |

*Primary Examiner*—David Brunsman

[57] ABSTRACT

An inorganic based strippable coating is provided for isolating hazardous materials. The coating is formed from a metal alkoxide material which undergoes a sol-gel reaction to form a metal oxide material. While the sol is still in a green state, the sol is applied to the surface to be protected. Any hazardous material such as nuclear contamination present on the surface is trapped within the matrix of the sol. The sol coating may be stripped from the surface while in a green state or may be allowed to harden. Once hardened, the sol forms a metal oxide coating which will deter the future accumulation of contamination.

7 Claims, No Drawings

INORGANIC BASED STRIPPABLE COATINGS FOR ISOLATING HAZARDOUS MATERIALS AND METHOD FOR MAKING AND USING THE SAME

BACKGROUND OF THE INVENTION

1. Field of the Invention

The present invention relates to protective coatings. More particularly, the present invention relates to coatings which are applied to a vessel and adhere to and isolate a surface of the vessel to prevent the release of airborne contaminants.

2. Description of the Prior Art

In the nuclear industry, coatings, such as strippable coatings, are used to protect surfaces from contamination and to decontaminate surfaces that have acquired loose contamination. In the decontamination application, the strippable coatings are laid over a contaminated surface and allowed to set up or cure to a stable form. In the stable form, the coatings are removed from the surface, carrying away the loose contamination which is now fixed in the coating matrix.

Although these strippable coatings are capable of removing the surface contamination, they are hindered by compositional problems. The strippable coatings often use organic carriers and drying agents which are now listed with the environmental protection agency as being volatile organic compounds (VOC). These organic carriers and drying agents lead to the potential formation of mixed waste when the carrier and the vapors condense. Use of such strippable coatings causes the VOC level for a particular plant to increase.

In addition to using organic carriers and drying agents, many strippable coatings are in themselves resin or other organic based. As a result, such coatings themselves may at some point constitute a mixed waste fraction in that the coating is a hazardous or ignitable material which contains radioactive material trapped in its matrix.

The use of these prior art strippable coatings can create environmental problems of their own in their application and their removal. Consequently, there is a need for a coating to protect surfaces from contamination and to decontaminate surfaces that have acquired loose contamination which neither increases the environmental problems of a plant nor creates disposal problems.

SUMMARY OF THE INVENTION

An inorganic-based strippable coating is provided for isolating contamination on the surface of a vessel. Because the coating is inorganic based, use of the coating will not increase the VOC level for the plant provided the carriers used to apply the coating are inorganic-based materials as well. Moreover, such coatings will not constitute a mixed waste of hazardous or ignitable material and radioactive compounds trapped in the matrix.

The strippable coating of the present invention uses an alcohol based sol gel matrix formed from a metal alkoxide material. The alkoxide mixture, preferably a silica sol gel, is formed and polymerized. Once polymerized, the sol is applied over the contaminated area in a relatively thin mixture of polymers suspended in ethanol. Once the sol dries to a green or semi-stable state, it forms a coating over the contaminated area. At this point the bulk of the VOC component [primarily benign alcohols such as methanol ($CH_3OH$), ethanol ($C_2H_5OH$), and propanol ($C_3H_7OH$)] have been removed. Any further carrier or sol decomposition products resulting from the cure step are $CO_2$ and water. The sol coating is removed from the contaminated area by conventional decontamination technology. Alternatively, the sol may be allowed to dry to a hard coating which can be removed or allowed to remain on the vessel serving as a permanent encapsulation of any pre-existing surface contamination.

When the sol is applied to the surface of the vessel, the loose contamination on the vessel's surface either becomes fixed in the sol matrix or is trapped under it. When the sol is removed from the vessel, the contamination trapped in the matrix thereof is removed along therewith. The removed coating is then chopped, shredded and fired to form silica-encapsulated waste. The sol coating at this point is not resin or organic based and does not contain organic carriers and drying agents. As such, the silica-encapsulated waste is not a secondary waste, thus eliminating a concern regarding disposal of mixed waste fractions. On firing, this mixture forms a glass-encapsulated waste form which is acceptable for disposal.

DESCRIPTION OF THE PREFERRED EMBODIMENTS

An alcohol-based, sol gel matrix formed from a metal alkoxide is used to replace the organic components of strippable coatings which protect vessel surfaces from contamination and decontaminate surfaces that have acquired loose contamination. Such strippable coatings are used in the decontamination and nuclear services industries. A typical alkoxide mixture which can be used to form the sol gel is provided in Table 1 below:

TABLE 1

| SOL GEL FORMULA | |
|---|---|
| Deionized Water | 4–5 moles |
| 200 Proof Ethanol | 5–6 moles |
| 70 w/o $HNO_3$ | 10 drops |
| Alkoxide | 2 moles |
| Ethanol (200 proof) | 4.8 grams |

In forming the sol gel, the deionized water and 200 proof ethanol are added to a clean and dry glass reactor. The nitric acid is then added and the contents are mixed to produce a homogenous mixture. The alkoxide is added as rapidly as possible and additional ethanol is added to bring the weight of the solution to 750 grams. The reactor is closed and agitated. The solution is then heated under alcohol reflex temperature for no greater than 16 hours. During this heating process, the alkoxide mixture polymerizes to form the sol. The bulk of the residual alcohol can be recovered before the sol is applied.

Preferably, the sol gel used to make the coating is a silica based material. The precursor material for the metal alkoxide mixture is preferably silicon chloride ($SiCl_4$). In an anhydrous reaction with an alcohol such as methanol or ethanol, the silicon chloride forms a silicon alkoxide mixture. Under alcohol reflex temperature conditions, the silicon alkoxide mixture will hydrolize and subsequently polymerize to form a sol. Once the sol dries, a silica coating is formed.

Once the sol is polymerized, the sol is spread over a contaminated vessel surface such as a pipe in a nuclear plant. The sol is applied in a relatively thin mixture of polymer in ethanol. Ethanol is recommended as the polymer solvent because it is not toxic. Once the sol dries to a green or semi stable state, the sol may be removed by conventional decontamination technology such as cutting, scraping, hydrolasering, or scabbling. The removed coating is then chopped, shredded and fired to form silica encapsulated waste. The coating may also be mixed after removal from the surface with other glass shot, and melted to form a vitrified radwaste form. Although feasible for low level waste, such technology is particularly attractive for high level waste and transuranic (TRU) waste.

In an alternative embodiment, a residual coating film may be left behind on the vessel surface after an exterior portion of the sol gel is stripped. This residual coating film may be cured to form a solid silica coating which will serve as a barrier to future recontamination of the vessel surface. Where a residual silica coating is left on the vessel, additional applications of the sol gel solution on the coated vessel may be used to decontaminate future accumulation of loose contamination. In such an instance, the procedures for applying and removing the sol are the same as if the sol were placed on the bare metal surface. The advantage of maintaining the silica coated vessel is that a glass coated vessel is more resistant to contamination and will not increase the background activity of the contamination as much as a bare metal surface. Additionally, a glass coating is more easily decontaminated than a bare metal vessel surface because corrosion films containing activation products are formed. Chemical decontamination is much simpler and mineral acids such as hydrogen chloride which reduce the amount of secondary waste can be used in place of stronger organic acids.

A particularly attractive feature of the silica coated vessel is the ease with which the silica coating can be repaired using the sol gel process. In the case of a break wherein bare pipe or vessel shows through a crack in the coating, the sol gel solution merely needs to be applied to the crack or break in the coating and allowed to cure therein. In the event of a bonding problem in which the coating integrity no longer remains intact, such as in the case of the formation of a bubble or blister, an additional quantity of sol gel solution can be applied to cure the bonding problem. The additional sol gel solution may be applied inside the bubble or blister by means of a syringe. If the bubble is too large, however, the bubble can be broken off and new sol gel applied to the surface of the bare metal vessel in a manner similar to that used to cure a crack or break. Such operations can be performed either directly or remotely.

The present inorganic based strippable coatings eliminate (or at least minimize) RCRA-listed components from strippable coatings for nuclear application. This reduces the formation of mixed waste in a nuclear decontamination application and may form an initial step in the vitrification of the loose contamination removed by the coating. The present strippable coatings eliminate the problem of secondary waste by not requiring the presence of a volatile organic carrier or drying agent and by not being organic based itself.

It has been found that the present sol-gel coating can be applied to flexible tubes without drastically hindering the flexibility of the tube. To accomplish this, the coating must be applied in a thin layer. It has been found that successive layers of micron-magnitude thickness applied to the surface of the flexible tube will, in essence, provide a flexible silica-coated tube.

While I have described a present preferred embodiment of the invention, it is to be distinctly understood that the invention is not limited thereto but may be otherwise embodied and practiced within the scope of the following claims.

I claim:

1. A process for isolating contamination on a surface of a vessel comprising the steps of
   (a) forming a metal alkoxide sol-gel solution;
   (b) applying said sol-gel solution to said vessel surface;
   (c) allowing said solution to dry, said contamination being fixed in the matrix of said coating;
   (d) removing at least a portion of said coating from said vessel; and
   (e) firing said removed coating to form a silica-encapsulated waste.

2. The process of claim 1 wherein the metal alkoxide is a silica-based compound.

3. The process of claim 2 wherein said metal alkoxide is formed by reacting silicon chloride with at least one of methanol and ethanol under anhydrous conditions.

4. The process of claim 1 wherein said metal alkoxide sol-gel solution is mixed with ethanol prior to applying to said surface of said vessel.

5. The method of claim 1 wherein said coating is removed from said vessel by at least one of cutting, scraping, hydrolasering and scabbling.

6. The process of claim 1 further comprising the steps of chopping and shredding said removed coating before forming said silica-encapsulated waste.

7. The process of claim 1 wherein a film of said coating resides on said vessel after removing said at least a portion of said coating, said residual film forming a solid silica coating when cured.

* * * * *